Patented Feb. 6, 1945

2,369,023

UNITED STATES PATENT OFFICE 2,369,023

PROCESS OF PRODUCING ANHYDROUS PURE PARA ACETYLAMINE BENZENE SULPHONYL CHLORIDE AND PRODUCT THEREOF

Harold W. Coward, Glen Rock, and Lincoln M. Shafer, Montclair, N. J., assignors, by mesne assignments, to Aridye Corporation, a corporation of New Jersey No Drawing. Application November 25, 1942, Serial No. 466,920

9 Claims. (Cl. 260—543)

This invention consists in an improved process for producing anhydrous, pure para acetylamino benzene sulphonyl chloride and in a novel addition product of nitrobenzene and sulphonyl chloride.

In the manufacture of anhydrous para acetyl amino benzene sulphonyl chloride (or, as it is in this description termed merely for the sake of brevity, "sulphonyl chloride") as ordinarily practiced, acetanilide is warmed in an excess of chlorsulphonic acid and the resulting sulphonation mass diluted at low temperature, as by drowning in chipped ice and water. Having thus produced the sulphonyl chloride, the water and residual acid are removed, as by filtering, so that the sulphonyl chloride remains as a crude wet paste containing from 50 to 70% water.

The removal of this large residual amount of water to form a pure anhydrous material is extremely difficult due to the tendency of the sulphonyl chloride to hydrolyze readily to the para acetylamino benzene sulphonic acid in the presence of water.

Also during the sulphonation step a considerable amount of sulphone,

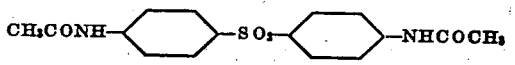

is formed and remains in the isolated sulphonyl chloride. Again the dried product is likely to be and usually is contaminated by woodchips, sawdust, and other foreign particles contributed by the ice in the drowning step. There is also present some sulphonic acid.

By our invention we are able to remove the sulphonyl chloride from the water in a substantially anhydrous form, rapidly and without recourse to high temperatures, and at the same time to remove any sulphone, sulphonic acid and foreign materials.

In our process the crude wet paste of sulphonyl chloride obtained as described above and containing from 50 to 70% water is suspended in nitrobenzene stirred and warmed slightly to dissolve the sulphonyl chloride and allowed to stand a short time to permit the water present to separate as a supernatant layer. This water layer is then drawn off, carrying away with it any foreign matter as woodchips, sawdust, etc., as may be present and also any sulphonic acid which may have formed, leaving the substantially anhydrous sulphonyl chloride in nitrobenzene solution.

The nitrobenzene solution of the sulphonyl chloride is then treated to separate out in crystalline state the addition product of nitrobenzene and sulphonyl chloride. For this purpose the solution may be cooled to a quite low temperature (as approximately 5° C.) to effect crystallization, or it may be diluted with a refined petroleum spirit to precipitate out in crystalline state said addition product. In either case said addition product in crystalline state results, any by-product sulphone, if present, remaining in solution in the mother liquor.

The crystals, when separated from the liquid, contain approximately 30% nitrobenzene, and this may be removed by treating them with a hydrocarbon solvent, as with warm petroleum spirit and filtering. (They have a melting-point range of approximately 110-125° C.) The temperature at this stage should not be lower than 20° C., because otherwise the original addition product of nitrobenzene and sulphonyl chloride re-forms. Removal of any residual solvent and complete drying may be thereupon readily effected, preferably under vacuum at moderate temperature.

Besides the indicated advantages of our procedure there is an appreciable saving of time and very little loss in yield.

Example #1

From 1400-1500 lbs. of crude wet paste formed as hereinbefore described and containing from 425-450 lbs. of sulphonyl chloride are added to 1300 lbs. of nitrobenzene while stirring. By external heating and with stirring the slurry is heated to 56-60° C. to dissolve the sulphonyl chloride. On standing a short time the water separates as a supernatant layer and is removed, as by decantation, together with such foreign matter as woodchips, etc., as may be present therein, and such sulphonic acid as may have formed. The substantially anhydrous nitrobenzene solution of sulphonyl chloride is then cooled to 5-7° C., whereby the crystalline addition-product of the sulphonyl chloride and nitrobenzene separates and is filtered off. Thereupon the remaining press cake is slurried in 720 lbs. of Varsol #2 (petroleum spirit having a boiling range of 150-200° C.) heated to 50-55° C., filtered, washed with 400 lbs. of petroleum spirit (boiling range 65-95° C.) at room temperature and dried under vacuum at 35-40° C. Approximately 420 lbs. of pure sulphonyl chloride is obtained.

Example #2

From 1400-1500 lbs. of crude wet paste formed as hereinbefore described and containing 425-450 lbs. of sulphonyl chloride are added to 1500 lbs. of nitrobenzene while stirring. By external heat and with stirring the slurry is heated to 50-55° C. to dissolve the sulphonyl chloride and allowed to stand until the water forms a supernatant layer and is removed. The remaining substantially anhydrous nitrobenzene solution of the sulphonyl chloride is then cooled to 18-20° C., whereupon 700 lbs. of Varsol #2 (petroleum spirit with a boiling range 150-200° C.) is added with stirring and the pure crystalline addition product of nitrobenzene and sulphonyl chloride on precipitating is filtered off. The sulphonyl chloride cake is then slurried in 800 lbs. of petroleum spirit (boiling range 150-200° C.) warmed to 55-58° C. and filtered off, washed with 300 lbs. of petroleum spirit (boiling range 65-95° C.) at 38-42° C. and dried at 45° C., preferably under vacuum. Approximately 425 lbs. of pure sulphonyl chloride is obtained.

The proportions mentioned in the examples and the temperatures as therein set forth may be varied within reasonable limits, as will be understood by any one skilled in the art.

Having thus fully described our invention, we claim:

1. The process of treating crude wet para acetylamino benzene sulphonyl chloride paste which consists in suspending the paste in a bath of warmed nitrobenzene until the water present in the paste separates as a supernatant layer, and separating such layer from the remaining solution containing nitrobenzene and para acetylamino benzene sulphonyl chloride.

2. The process of treating crude wet para acetylamino benzene sulphonyl chloride paste which consists in suspending the paste in a bath of warmed nitrobenzene until the water present in the paste separates as a supernatant layer, separating such layer from the remaining solution containing nitrobenzene and para acetylamino benzene sulphonyl chloride, and treating said solution to separate out in crystalline state the addition product of nitrobenzene and para acetylamino benzene sulphonyl chloride.

3. The process of treating crude wet para acetylamino benzene sulphonyl chloride paste which consists in suspending the paste in a bath of warmed nitrobenzene until the water present in the paste separates as a supernatant layer, separating such layer from the remaining solution containing nitrobenzene and para acetylamino benzene sulphonyl chloride, and cooling said solution to separate out in crystalline state the addition product of nitrobenzene and para acetylamino benzene sulphonyl chloride.

4. The process of treating crude wet para acetylamino benzene sulphonyl chloride paste which consists in suspending the paste in a bath of warmed nitrobenzene until the water present in the paste separates as a supernatant layer, separating such layer from the remaining solution containing nitrobenzene and para acetylamino benzene sulphonyl chloride, and diluting said solution with a petroleum hydrocarbon to precipitate out in crystalline state the addition product of nitrobenzene and para acetylamino benzine sulphonyl chloride.

5. The process of treating crude wet para acetylamino benzene sulphonyl chloride paste which consists in suspending the paste in a bath of warmed nitrobenzene until the water present in the paste separates as a supernatant layer, separating such layer from the remaining solution containing nitrobenzene and para acetylamino benzene sulphonyl chloride, treating said solution to separate out in crystalline state the addition product of nitrobenzene and para acetylamino benzene sulphonyl chloride, and treating said product with a hydrocarbon solvent.

6. The process of treating crude wet para acetylamino benzene sulphonyl chloride paste which consists in suspending the paste in a bath of warmed nitrobenzene until the water present in the paste separates as a supernatant layer, separating such layer from the remaining solution containing nitrobenzene and para acetylamino benzene sulphonyl chloride, treating said solution to separate out in crystalline state the addition product of nitrobenzene and para acetylamino benzene sulphonyl chloride, and treating said product with warm petroleum spirit of a high boiling range.

7. The process of treating crude wet para acetylamino benzene sulphonyl chloride paste which consists in suspending the paste in a bath of warmed nitrobenzene until the water present in the paste separates as a supernatant layer, separating such layer from the remaining solution containing nitrobenzene and para acetylamino benzene sulphonyl chloride, treating said solution to separate out in crystalline state the addition product of nitrobenzene and para acetylamino benzene sulphonyl chloride, and treating said product first with a warm petroleum spirit at a temperature of at least 20° C. and then with a petroleum spirit of a lower boiling range.

8. The process of treating crude wet para acetylamine benzene sulphonyl chloride paste which consists in suspending the paste in a bath of nitrobenzene warmed to moderate temperature, separating the resulting supernatant aqueous layer from the remaining solution containing nitrobenzene and para acetylamine benzene sulphonyl chloride, cooling said solution to approximately 5-7° C., filtering off the resulting crystalline addition product including nitrobenzene and para acetylamine benzene sulphonyl chloride, slurrying said addition product with warmed petroleum spirit having a boiling range of 150-200° C., whereby to remove from the crystals such solvent as is contained therein, filtering the slurry, and washing the crystals with petroleum spirit having a boiling range of 65-95° C., whereby to remove from the crystals such solvent as remains superficially thereon, and finally drying the crystals, the proportions of said paste and nitrobenzene being approximately .933-1 to 1 and the proportions of said paste and petroleum spirit being approximately 933-1 to .2.

9. An addition product of nitrobenzene and para-acetylamino-benzene sulphonyl chloride, said product existing in crystalline state and having a melting-point range of approximately 110-125° C.

HAROLD W. COWARD.
LINCOLN M. SHAFER.